Oct. 7, 1952 — W. G. SPURLIN ET AL — 2,613,113
ADJUSTABLE WHEEL ASSEMBLY
Filed July 26, 1949 — 2 SHEETS—SHEET 1
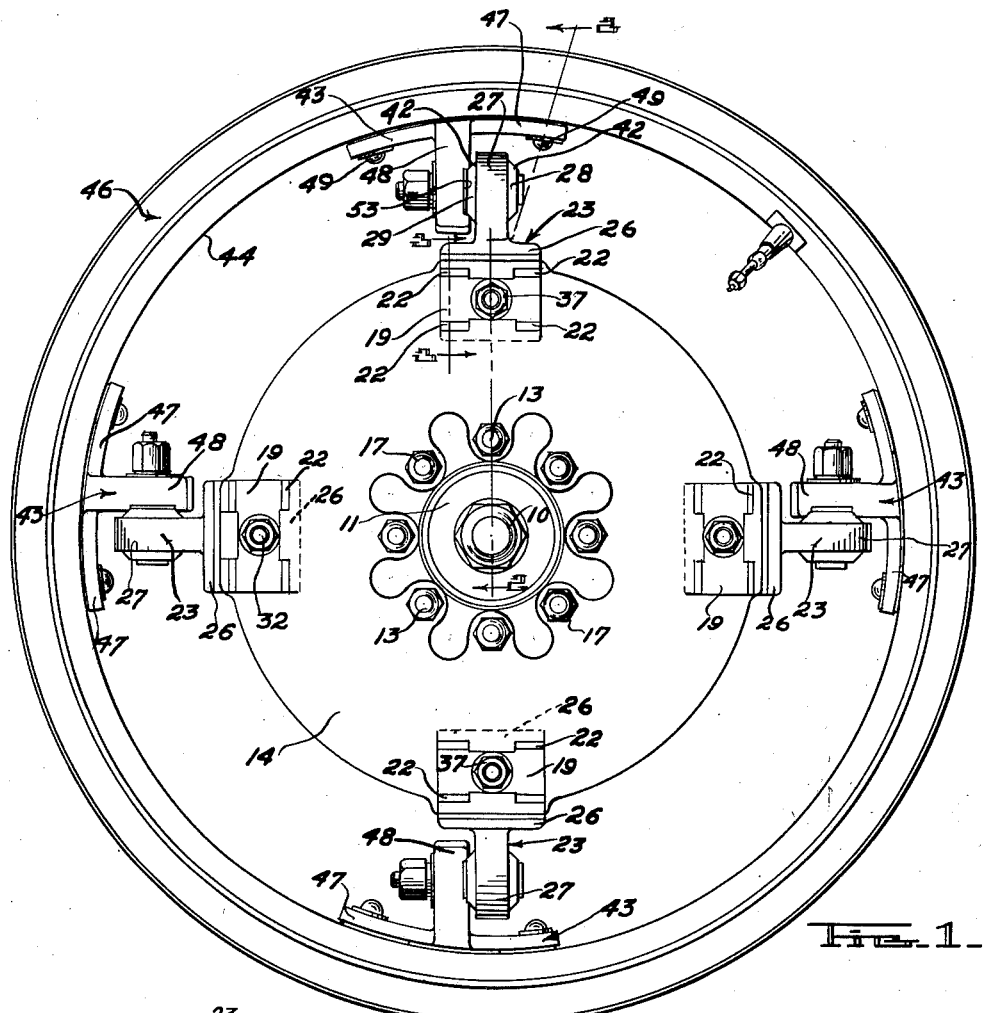
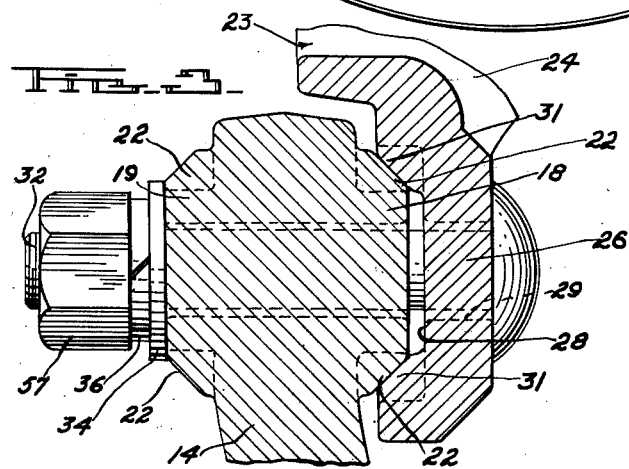
W. G. SPURLIN
H. L. BROCK
INVENTOR.
ATTORNEYS

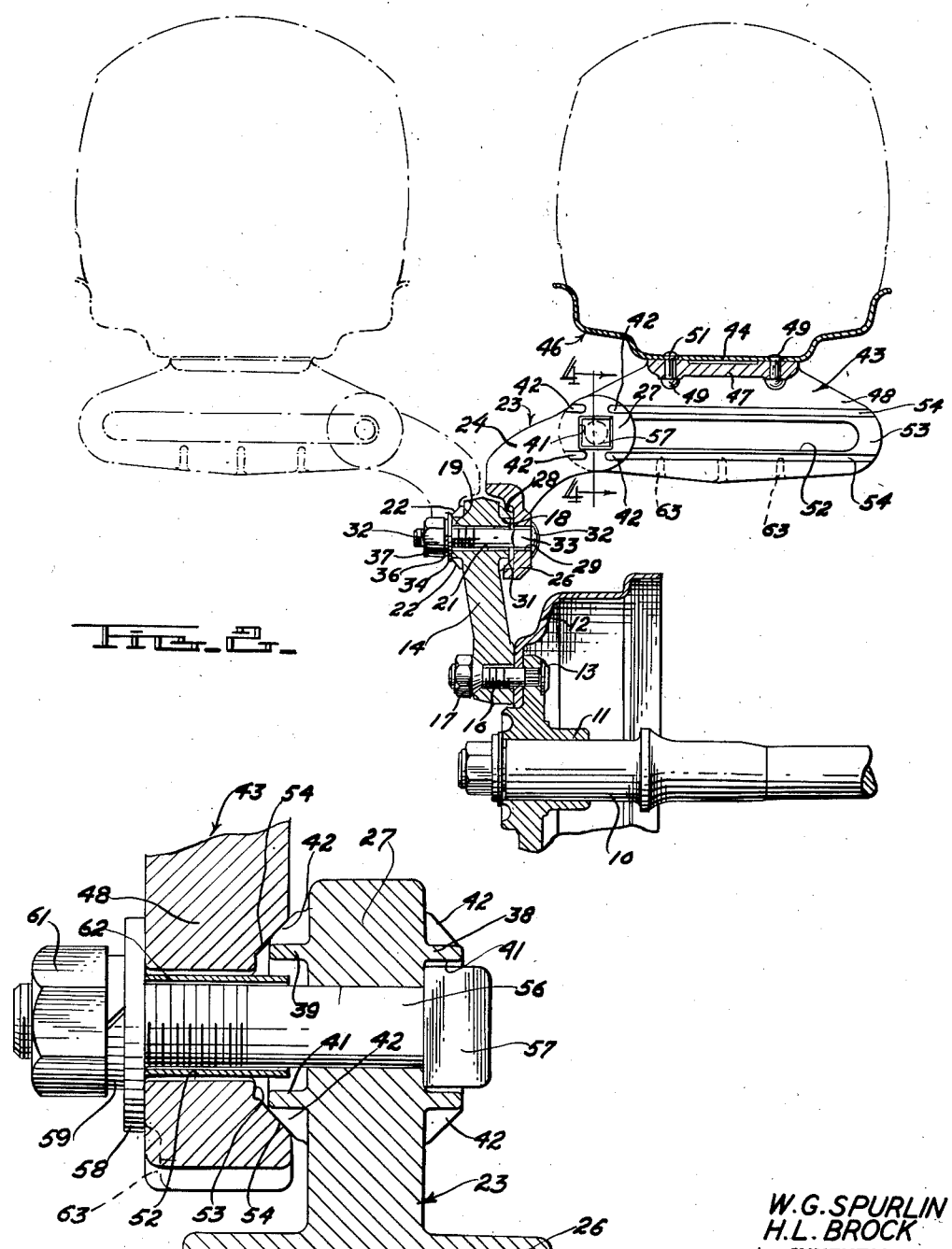

Patented Oct. 7, 1952

2,613,113

UNITED STATES PATENT OFFICE 2,613,113

ADJUSTABLE WHEEL ASSEMBLY

William G. Spurlin, Dearborn, and Harold L. Brock, Detroit, Mich., assignors to Ford Motor Company, Dearborn, Mich., a corporation of Delaware Application July 26, 1949, Serial No. 106,834

10 Claims. (Cl. 301—9)

This invention relates generally to an adjustable wheel assembly and has particular reference to a wheel assembly wherein the wheel tread of the vehicle may be easily changed.

It is essential that tractors for agricultural purposes be constructed so that the wheel tread may be readily varied throughout a considerable range to meet the requirements of the particular operation being performed. Various constructions have heretofore been proposed and used to accomplish this wheel tread adjustment. For example, wheel rims and wheel discs have been designed with offset attaching portions so that various tread adjustments are possible by attaching the wheel disc to the inner and outer portions of the rim and by reversing the wheel rim. Other tractors provide an adjustable tread by mounting the wheel upon a hub or axle extension, while others have cooperating cam devices upon the rim and wheel so that the rim may be axially moved relative to the wheel. In all of these constructions, however, it is necessary, in order to obtain the amount of tread adjustment necessary, to remove the tire and rim and to either reverse them or interchange them with the opposite tire and rim. Tractor wheels are very heavy, and it is extremely difficult to remove and handle such a wheel without special equipment. Tread adjustments have therefor been extremely difficult to make and have required a substantial amount of time.

It is accordingly an object of the present invention to provide an adjustable wheel assembly wherein the usual amount of wheel tread adjustment can be obtained quickly and easily, and without the necessity of removing the heavy wheel and tire from the vehicle. This is accomplished by providing a tractor wheel having a plurality of removable and reversible spokes which may be mounted upon the wheel disc in such a manner as to extend either axially inwardly or outwardly from the disc. In addition, the wheel rim carries a corresponding number of brackets formed with axially extending slots and guideways so that they can be adjustably connected to the outer ends of the spokes in a plurality of axial positions.

With the construction briefly described above, it will be seen that a predetermined range of axial adjustment of the rim and tire may be obtained for each position of the spokes. Since the spokes may be mounted upon the wheel disc in two different positions, two ranges of adjustment are thus provided and together permit axial adjustment of the rim and tire throughout an overall axial range sufficient to provide the requisite tread width for the various farming operations. A further feature of the construction resides in the fact that the two aforementioned ranges of adjustment overlap each other sufficiently so that in one axial position of the rim and tire the spokes may be mounted upon the wheel disc in either of their two positions and yet be secured at their outer ends to the guide brackets carried by the wheel rim. This arrangement enables the wheel rim and tire to be adjusted throughout its overall range without being removed or reversed, thus enabling any adjustment to be obtained with a minimum of time and effort. To accomplish, for example, a tread adjustment from the minimum tread width to the maximum tread width, the wheel rim and tire and the guide brackets carried thereby are moved axially outwardly upon the mounting bolts carried at the outer ends of the wheel spokes until they have reached their outermost position. With the wheel in this position, the spokes may be disconnected one by one from the wheel disc and from the guide brackets carried by the rim, and then reversed and reattached to the wheel disc on the opposite side thereof and to the opposite ends of the guide brackets. When all of the spokes have thus been reversed, the wheel rim and tire may be again moved outwardly throughout the extent of the guideways until the maximum tread width is reached.

The foregoing and other objects of the invention will be made more apparent as this description proceeds, particularly when considered in connection with the accompanying drawings, wherein:

Figure 1 is a side elevation of a tractor wheel assembly constructed in accordance with the present invention.

Figure 2 is a transverse cross-sectional view taken substantially on the plane indicated by the line 2—2 of Figure 1 and showing in full lines the wheel in its innermost position, and in phantom the wheel in its outermost adjusted position.

Figure 3 is an enlarged cross-sectional view taken substantially on the plane indicated by the line 3—3 of Figure 1, and illustrating the connection between the wheel disc and a spoke.

Figure 4 is an enlarged cross-sectional view taken substantially on the plane indicated by the line 4—4 of Figure 2, and illustrating the connection between a spoke and a wheel rim guide bracket.

Referring now more particularly to the drawings, and especially to Figure 2, the reference character 10 indicates a conventional tractor rear axle upon which is mounted a hub 11 and a brake drum 12. A series of mounting bolts 13 are carried by the wheel hub 11 and extend outwardly therefrom for receiving and supporting a wheel disc 14. The wheel disc 14, together with other parts of the present wheel assembly, are shown as castings, and while this construction is desirable from the standpoint of strength and also since it provides additional weight which is advantageous in tractor wheels, it will be understood that these parts may alternatively be stampings or forgings if desired. The inner portion of the wheel disc 14 is provided with a series of holes 16 so that the wheel disc 14 may be mounted upon the mounting bolts 13 carried by the wheel hub and brake drum and held thereon by nuts 17.

Near its outer periphery, the wheel disc 14 is formed, in four equally spaced angular zones, with embossed portions 18 and 19 extending inwardly and outwardly, respectively, from the wheel disc. A hole 21 extends axially through the embossed portions 18 and 19 and the wheel disc 14. Adjacent the radially inner and outer edges of the embossed portions 18 and 19 the wheel disc 14 is formed with pads 22, each of which is generally rectangular in shape and extends at a 45 degree angle to a vertical plane through the wheel disc. It will be seen that four such pads are provided at the inner side of the wheel disc adjacent the embossed portion 18 and that a similar set of four pads are provided at the outer side of the wheel disc adjacent the embossed portion 19. It will be apparent, particularly from an examination of Figure 3, that the outer peripheral portions of the wheel disc 14 are symmetrical about a central vertical plane through the disc. As will be discussed more in detail later, the pads 22 provide seating surfaces for mounting spokes upon the wheel discs and for automatically centering and aligning the spokes when they are attached thereto. For this purpose the two pads 22 located radially outwardly from the embossed portion on each side are inclined oppositely to the two pads located readily inwardly therefrom.

Each wheel is provided with four spokes 23 adapted to be mounted upon the pads 22 formed at the outer periphery of the wheel disc 14. Each spoke 23 has a central arcuate portion 24, an inner mounting flange 26 and an outer mounting flange 27. The inner mounting flange 26 is formed with a recessed portion 28 and with a centrally located square hole 29. Adjacent the inner and outer edges of the recessed portion 28, each spoke is formed with beveled pads 31, the two pads at the outer side of the recess being oppositely inclined with respect to the two pads at the inner side thereof, and the pads being formed at a 45 degree angle to a vertical plane. The pads 31 upon the spokes are thus arranged in complementary fashion to the pads 22 upon the wheel disc and are adapted to be seated there against. A carriage bolt 32 having a square shank portion 33 extends through the aligned holes 29 and 21 in the spoke and disc respectively, and a flat washer 34, lockwasher 36 and nut 37 are assembled upon the threaded end of the bolt 32 with the flat washer 34 resting against the embossed portion 19 of the wheel disc. It will be noted that the diameter of the bolt 32 is somewhat smaller than the diameter of the hole 21 in the wheel disc so that sufficient clearance is provided therebetween to permit the spoke to be properly seated and clamped upon the wheel disc.

The outer mounting flange 27 of each spoke 23 has embossed portions 38 and 39 extending from opposite faces thereof with square recesses 41 formed in said embossed portion. In addition, the outer mounting flange 27 is provided on each side with a pair of beveled pads 42 at the outer and inner sides of the embossed portions. Four such pads are thus provided on each side of each spoke. The pads 42 are inclined at a 45 degree angle to a vertical plane with the pads at the outer sides of the embossed portion being inclined oppositely to those of the inner side thereof. It will be seen that the two faces of the outer mounting flange 27 are symmetrical with respect to each other, and are generally similar in configuration to the configuration of the faces of the outer peripheral portion of the wheel disc in the mounting zone. The outer mounting flanges 27 of the spokes 23 are adapted to be adjustably connected to guide brackets carried by the wheel rim and described more in detail hereinafter.

At four angularly spaced points a guide bracket 43 is mounted upon the radially inner surface of the base flange 44 of the wheel rim 46. Each guide bracket 43 is in the form of a casting having a base flange 47 and a generally radially inwardly extending mounting flange 48 located centrally of the base flange. As seen in Figure 1, the base flange 47 is arcuate in shape to correspond to the shape of the base flange 44 of the wheel rim, and is secured thereto by four rivets 49 with the inner heads 51 of the rivets being relatively flat so as not to interfere with the tire and tube.

Referring now to Figure 2 it will be seen that the mounting flange 48 of each guide bracket corresponds generally in width to the width of the wheel rim 46, and is provided with an elongated transversely extending slot 52. One side of the mounting flange 48 is formed with a transversely extending groove 53 somewhat wider than the slot 52 and having opposite beveled side walls 54 formed at a 45 degree angle to a vertical plane and oppositely inclined with respect to each other. The beveled side walls 54 form a transversely extending guide way adapted to be engaged by the beveled pads 42 provided on opposite sides of the outer mounting flange 27 of the spoke. A bolt 56, having a square head 57 adapted to be received within the square recess 41 formed in the embossed portion at one side of the outer mounting flange of the spoke, extends through the elongated slot 52 of the mounting flange of the guide bracket 43. A flat washer 58, lock washer 59, and nut 61 are assembled to the opposite threaded end of the bolt 56 and serve to clamp the spoke and guide bracket together.

It will be noted from an examination of Figure 4 that the slot 52 in the guide bracket is considerably wider than the diameter of the mounting bolt 56 passing therethrough, and that a bushing 62 encircles the bolt and extends through the slot with a clearance space being left on the opposite sides thereof. When adjusting the rim and tire relative to the spokes, the bushings 62 facilitate the movement of the mounting bolts 56 along the slots 52.

*Operation*

In the position shown in Figure 2, the spokes 23 are mounted upon the inner side of the wheel disc 14 and extend axially inwardly from the wheel disc so that the outer mounting flanges 27 of the spokes are located a considerable distance inwardly from the wheel disc. In addition, in the position shown, the tire and wheel rim, and the guide brackets 43 carried thereby, are at their innermost positions with the mounting bolts 56 connecting the spokes and guide brackets together being at the outer ends of the slots 52. To increase the tread width of the tractor wheels, it is only necessary to jack up the adjacent end of the axle to raise the tire from the ground, and to loosen the mounting bolts 56, securing the spokes and guide brackets together. The tire and rim can then be readily shifted axially outwardly throughout the range provided by the length of the elongated slot 52, and clamped in the selected position by tightening the bolts 56. Axial adjustment of the tire and rim is facilitated if the tire and rim are rotated to the position shown in Figure 1 in which two of the mounting brackets 43 are located in horizontal alignment at opposite sides of the axle. In this position it will be seen that the mounting flanges 48 of the guide brackets 43 at opposite sides of the wheel extend substantially horizontally and rest upon the corresponding spokes 23 extending horizontally outwardly from the wheel disc 14. The weight of the wheel is thus carried by these two spokes at opposite sides of the wheel and the tire and rim can be readily moved axially without difficulty.

With the construction shown, adjustment of any desired increment can be obtained, but to assist in adjusting the wheel to secure particular tread widths, the mounting flanges 48 of the guide brackets 43 are provided with a series of spaced slots 63 formed in the inner edge thereof at equally spaced points to assist in visually adjusting the wheel to desired positions.

When the wheel tire and rim have been adjusted throughout the length of the elongated slot 52, further outward adjustment can be obtained by reversing the spokes 23. This can readily be accomplished by removing the spokes 23, one at a time, and reversing the spokes so that they assume the position shown in phantom in Figure 2 in which they are mounted upon the outer side of the wheel disc 14. As previously pointed out, the peripheral portion of the wheel disc 14 is symmetrical so that the spokes fit equally well upon the inner or outer surface thereof. When the first spoke has been removed and reversed, its outer mounting flange 27 can be reattached to the guide bracket 43 by replacing the mounting bolt 56. It will be noted that the length of elongated slot 52 is such that the spokes extending inwardly from the wheel disc may be attached to the guide bracket at one end of the slot 52 while the spokes which are being reversed and mounted upon the outer side of the wheel disc to extend outwardly therefrom can be attached to the opposite end of the slot. While the first spoke is being reversed the wheel is supported upon the remaining three spokes, and while the second spoke is being reversed the wheel is adequately supported upon the remaining two spokes. The two outwardly extending spokes now provide adequate support for the wheel so that the remaining two inwardly extending spokes can also be reversed. With all of the spokes now extending outwardly it will be seen that it will be possible to further adjust the wheel tire and rim axially outwardly throughout the range provided by the length of the elongated slot 52 until the maximum or outermost position is reached, as shown in the phantom position of Figure 2. When the spokes 23 are reversed it will be noted that the opposite faces of the mounting flanges 27 of the spokes engage the beveled side walls 54 of the grooves 53 formed in the guide brackets 43, but since the opposite sides of the mounting flanges 27 of the spokes are identical a proper fit is obtained.

During the attachment of the opposite ends of the spokes to the wheel disc and to the wheel rim guide brackets respectively, the beveled pads, together with the clearance provided between the mounting bolts and the holes through which they pass, permit ready assembly and self-alignment of the parts, regardless of manufacturing variations and other variations which may be present in the wheel position. In addition, it will be seen that the four pads provided at each point of connection permit a single bolt to be used at that connection point to securely clamp the parts together so that they cannot turn relative to each other.

It will now be apparent that with the construction described above the necessary overall range of tread adjustment can be readily obtained without removing the wheel and tire from the tractor, thus effecting a considerable saving in effort and time. In addition, the construction is relatively simple and does not add appreciably to the cost of the wheel assembly.

The wheel can be readily adapted for use with dual wheels simply by adding additional spokes on the outer side of the wheel disc and using longer bolts to secure the inner and outer spokes to the disc. These extra spokes can be easily removed for single wheel operation; and consequently there need be no protruding parts during normal operation.

If desired, the wheel disc can be made integral with the axle instead of separate therefrom as shown.

It will be understood that the invention is not to be limited to the exact construction shown and described, but that various changes and modifications may be made without departing from the spirit and scope of the invention, as defined in the appended claims.

What is claimed is:

1. In an adjustable wheel assembly, a wheel support, a plurality of completely separate spokes each adapted to be individually mounted upon said wheel support in two axially spaced positions, a tire-carrying rim, supports secured to the radially inner portion of said rim each provided with an axially extending slot, fastening means adjustably connecting the outer ends of said spokes to the slotted supports to provide a given range of axial adjustment of the tire-carrying rim for each position of said spokes, said range of axial adjustment of the rim relative to each spoke being at least as large as the distance between the two axially spaced positions of the outer ends of the spokes.

2. In an adjustable wheel assembly, a wheel support, a plurality of individually reversible spokes each adapted to be independently mounted upon said wheel support in reversed positions, a tire-carrying rim, a plurality of axially slotted brackets secured to said rim and supported upon the outer ends of said spokes, and cooperating means between said spokes and the slotted brackets secured to said tire-carrying rim providing a predetermined range of axial adjustment therebetween for each position of said spokes, said range of axial adjustment of the rim relative to each spoke being at least as large as the distance between the two positions of the outer ends of the spokes obtained when said spokes are reversed.

3. In an adjustable wheel assembly, a wheel support, a tire supporting wheel structure, a plurality of independent individually reversible spokes each having two axially spaced mounting portions, means rigidly attaching one of said mounting portions to said wheel support, a plurality of axially slotted brackets secured to said wheel structure, in either of two reversed positions, and means adjustably connecting the other of said mounting portions to the slotted brackets on said wheel structure to permit axial adjustment therebetween to provide a predetermined range of axial adjustment of said wheel structure, the distance between the two positions of said other mounting portions of the spokes obtained when said spokes are reversed being no greater than the said predetermined range of axial adjustment of the wheel structure.

4. In an adjustable wheel assembly, a wheel support, a plurality of separate spokes each adapted to be mounted upon said wheel support in a plurality of axially spaced positions, a tire supporting rim, a plurality of guide brackets supported upon said rim and corresponding in number and position to the number of spokes, a transversely extending elongated slot formed in each of said guide brackets, a mounting bolt extending through the upper end of each of said spokes and the corresponding slot in the adjacent guide bracket, and a cylindrical bushing in each of said slots surrounding the mounting bolt to facilitate axial adjustment of each guide bracket along its mounting bolt.

5. In an adjustable wheel assembly, a wheel support, a tire supporting wheel structure, a plurality of individual spokes each having two axially spaced mounting portions, means rigidly attaching one of said mounting portions to said wheel support, pin and slot means adjustably connecting the other of said mounting portions to said wheel structure to permit continuous axial adjustment therebetween to provide a predetermined range of axial adjustment of said wheel structure, and cooperating means upon said wheel support and said spokes enabling said spokes to be mounted upon said wheel support in reversed positions so that the second-mentioned mounting portions of said spokes may be selectively arranged in two axially spaced positions to increase the overall range of axial adjustment of said wheel structure, the shape of said spokes being such that the distance between the two positions of the second-mentioned mounting portions of the spokes obtained when said spokes are reversed is within the range of axial adjustment of said wheel structure upon said spokes.

6. In an adjustable wheel assembly, a generally radially extending wheel supporting member having a plurality of seating portions formed on opposite sides thereof at equally spaced zones around the periphery of the member and with the seating portions on opposite sides of the member being axially aligned with each other and generally symmetrical, a plurality of spokes each having an inner mounting portion adapted to be seated upon one of the seating portions of said wheel supporting member, means detachably connecting the inner mounting portions of said spokes to either side of said wheel supporting member, each of said spokes having an outer mounting portion axially spaced from said inner mounting portion, a tire supporting rim, and a plurality of guide brackets mounted upon the inner periphery of said rim at angularly spaced positions with the number of guide brackets corresponding to the number of spokes, a transversely extending elongated slot formed in each of said guide brackets, fastening elements extending through the upper mounting portions of said spokes and the slots in said guide brackets to mount said guide brackets upon said spokes for relative axial adjustment throughout the range provided by the length of said slots, a guideway provided upon each of said guide brackets having bearing surfaces on opposite sides of said slots and coextensive therewith, and guides provided upon the upper mounting portion of said spokes for engagement with the guideways provided upon said guide brackets, similar guide means being provided upon opposite sides of the upper mounting portions of said spokes for alternate engagement with said guideways when said spokes are reversed.

7. In an adjustable wheel assembly, a generally radially extending wheel supporting member having a plurality of seating portions formed on opposite sides thereof at equally spaced zones around the periphery of the member and with the seating portions on opposite sides of the member being axially aligned with each other and generally symmetrical, a plurality of spokes each having an inner mounting portion adapted to be seated upon one of the seating portions of said wheel supporting member, means detachably connecting the inner mounting portions of said spokes to either side of said wheel supporting member, each of said spokes having an outer mounting portion axially spaced from said inner mounting portion, a tire supporting rim, and a plurality of guide brackets mounted upon the inner periphery of said rim at angularly spaced positions with the number of guide brackets corresponding to the number of spokes, a transversely extending elongated slot formed in each of said guide brackets, fastening elements extending through the upper mounting portions of said spokes and the slots in said guide brackets to mount said guide brackets upon said spokes for relative axial adjustment throughout the range provided by the length of said slots, a guideway provided upon each of said guide brackets having bearing surfaces on opposite sides of said slots and coextensive therewith, and guides provided upon the upper mounting portion of said spokes for engagement with the guideways provided upon said guide brackets, similar guide means being provided upon opposite sides of the upper mounting portions of said spokes for alternate engagement with said guideways when said spokes are reversed, the guideways formed in said guide brackets comprises elongated recesses extending along said slots and having inclined side walls, and the guide means provided upon opposite sides of the upper mounting portion of said spokes comprising beveled pads arranged to engage the inclined side walls of the guideways in said guide brackets.

8. In an adjustable wheel assembly, a generally radially extending wheel supporting member having a plurality of seating portions formed on opposite sides thereof with the seating portions on opposite sides of the member being axially aligned with each other, a plurality of spokes each having an inner mounting portion adapted to be seated upon one of the axially aligned seating portions of the wheel supporting member, fastening means securing the inner mounting portion of each of said spokes and the adjacent seating portion of the wheel supporting member together, each of said seating portions of the wheel supporting member and the adjacent inner mounting portions of the spokes having inter-engaging inclined pads on both the radially inner side and the radially outer side of said fastening means, and a tire supporting structure mounted upon the outer ends of said spokes.

9. In an adjustable wheel assembly, a wheel support, a plurality of radially extending spokes each adapted to be mounted upon said wheel support in two axially spaced positions, a tire supporting rim, a plurality of guide brackets supported upon said rim and corresponding in number and position to the number of spokes, each of said brackets having an axially extending slot formed therein, fastening means extending through said slots to secure the guide brackets to the spokes, the slot in each of said brackets being long enough to permit the adjacent spoke to be attached thereto in either of the two axially spaced positions of the spoke without moving the guide bracket axially.

10. In an adjustable wheel assembly, a generally radially extending wheel supporting member, a plurality of radially extending spokes secured to said wheel supporting member near the periphery thereof and each adapted to be mounted upon said wheel supporting member in two axially spaced positions, a tire supporting rim, a plurality of guide brackets supported upon said rim and corresponding in number and position to the number of spokes, each of said guide brackets having an axially extending slot formed therein, and mounting bolts extending through the outer end of each of said spokes and the slot in the adjacent guide bracket, the slot in each of said brackets being long enough to permit the adjacent spoke to be attached thereto in either of the two axially spaced positions of the spoke without moving the guide bracket axially, said spokes and guide brackets being arranged in diametrically opposed pairs in such manner that when the wheel is rotated so that one such pair of spokes and brackets are horizontally opposite each other the brackets of that pair are on top of the adjacent spokes so the spokes will support the weight of the tire supporting rim during axial adjustment thereof.

WILLIAM G. SPURLIN.
HAROLD L. BROCK.

REFERENCES CITED

The following references are of record in the file of this patent:

UNITED STATES PATENTS

| Number | Name | Date |
|---|---|---|
| 1,213,241 | Olsen | Jan. 23, 1917 |
| 2,129,807 | Beckman | Sept. 13, 1938 |
| 2,162,696 | Burger | June 20, 1939 |
| 2,204,650 | Benjamin | June 18, 1940 |
| 2,239,463 | Mills | Apr. 22, 1941 |
| 2,245,574 | Danhaus | June 17, 1941 |
| 2,432,407 | Ginkel | Dec. 9, 1947 |
| 2,467,482 | Hutchings | Apr. 19, 1949 |